Patented Jan. 7, 1936

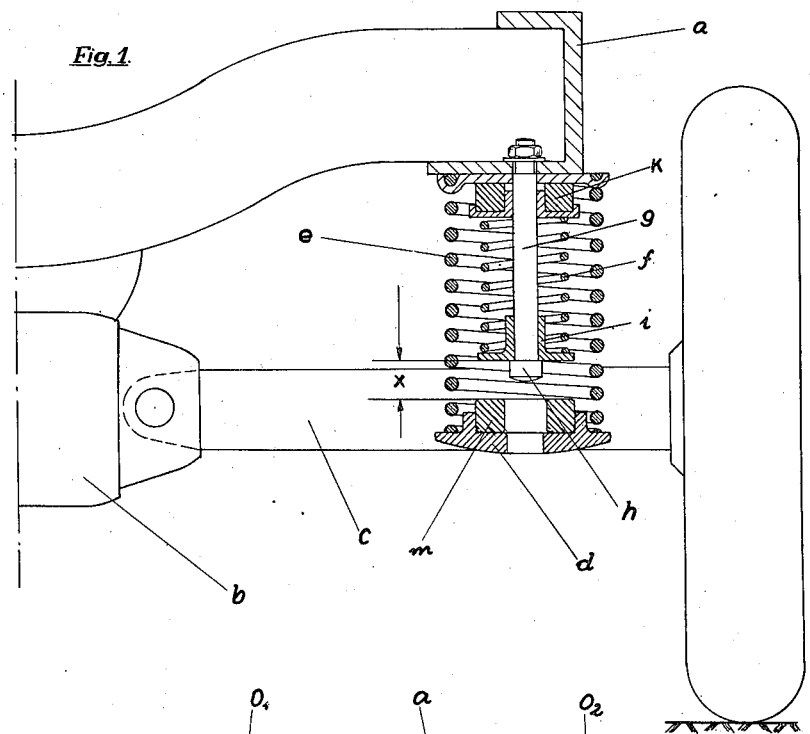
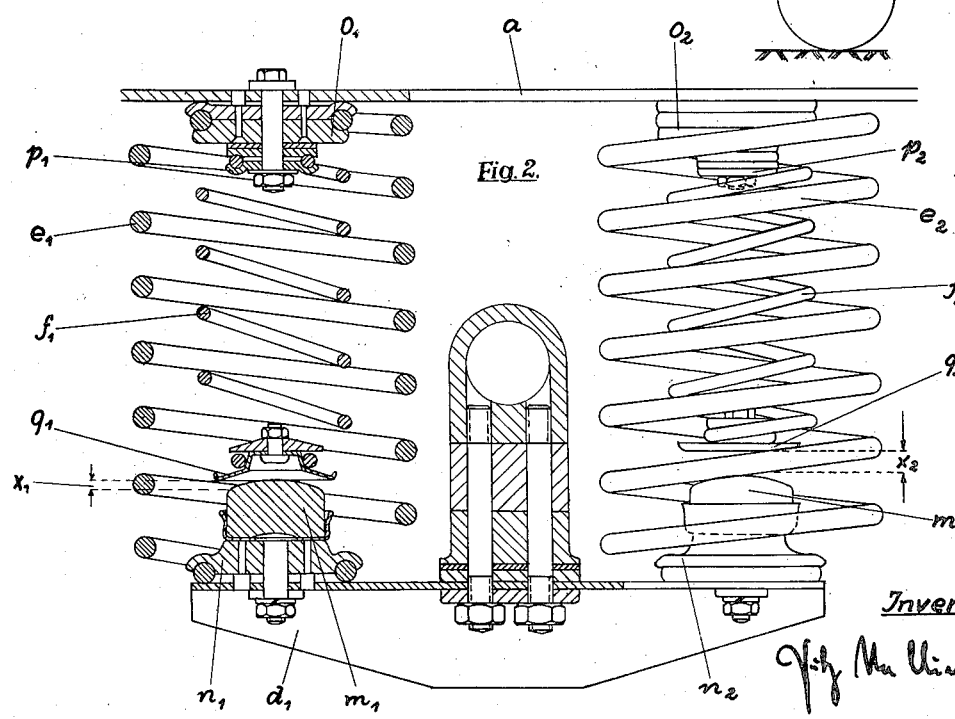

2,026,909

UNITED STATES PATENT OFFICE 2,026,909

SPRINGING ARRANGEMENT FOR VEHICLES

Fritz Nallinger, Stuttgart, Germany, assignor to Daimler-Benz Aktiengesellschaft, Stuttgart-Unterturkheim, Germany, a company of Germany Application January 26, 1934, Serial No. 708,463
In Germany February 4, 1937

11 Claims. (Cl. 267—20)

This invention relates to a springing arrangement with helical springs, more particularly for power-driven vehicles with independently guided wheels sprung by unguided helical springs and consists essentially in this that, more particularly in the interior of the helical springs, further additional helical springs are arranged which come into action with or without preliminary tension when a large load is applied to the main springs. The use of unguided helical springs gives the advantage that the springing works without friction and responds immediately to the smallest shocks. In this way it gives very smooth travel. These properties are further improved according to the invention by dividing the springing in such a manner that at first a soft springing is obtained and then a harder springing after a certain movement. Accordingly with a small load only the main springs are operated while with a greater load the action of the additional springs is added so as to give harder springing and prevent too great yielding. The latter is especially improved for swinging half axles as otherwise when yielding to a great extent or with a great load the wheels take up a very oblique position so that the springing is unfavourably influenced, for example, on account of the alteration of track and the tyres are subjected to lateral stresses. Preferably, rubber buffers are provided as stops for additional springs so that when the latter become effective an audible impact or a sudden spring shock is avoided.

In order to obtain an effective additional springing without a large spring path the additional springing arrangement may be given an initial tension. When using helical springs, the arrangement may with advantage be such that the additional springs are arranged within the main springs. By means of several additional springs coming into action successively it is possible to obtain a very soft springing with soft or graded transitions.

In the accompanying drawing two constructional examples for swinging half axles are illustrated in Figs. 1 and 2.

$a$ is the frame, $b$ the differential casing to which the half axle $c$ is jointed at the side. Between a spring block $d$ rigidly or movably connected with the half axles and the frame there is arranged according to Fig. 1 the helical spring $e$ acting as main spring. There is also arranged on the frame inside this main spring an additional spring $f$ which is supported, for example, with an initial tension between the rubber buffer $k$ and a spring plate $i$ sliding on the bolt $g$ and bearing against the stop $h$. The axle also carries a further rubber buffer $m$, which after yielding through the distance $x$, bears against the spring plate $i$ and displaces it on the bolt against the action of the additional spring $f$.

In Fig. 2 an additional springing without initial tension is provided.

On the axle $c$, shown in cross-section in this case, a transverse member $d_1$ is arranged. On this rest the two main springs $e_1$ and $e_2$ which are drawn in at their last convolutions and are attached to the transverse member or to the frame by fastening members $n_1$, $n_2$ or $o_1$, $o_2$. Below the fastening members $o_1$, $o_2$ are suspended by means of further fastening members $p_1$, $p_2$, the additional springs $f_1$, $f_2$ on the ends of which the stop plates $q_1$, $q_2$ are secured. Opposite the latter there are rubber buffers $m_1$, $m_2$ on the lower fastening members.

It is clear that the two additional springs are differently adjusted so that they come into action successively when the rubber buffers $m_1$ or $m_2$ come into contact with the stop plates $q_1$, $q_2$. In the constructional example, for example, a movement of $x_1$ on the left and a movement of $x_2$ on the right is necessary, the first being made practically equal to zero. In this way a soft transition to the additional springing is obtained.

The initial tensioning gives the further advantage that the action of the additional spring or springs can commence sufficiently quickly so that at or just after the horizontal position of the swinging half axles there is sufficient spring force to avoid the cross-leg position of the axles.

If several additional springs with initial tension are used they may be given different tensions.

What I claim is:

1. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring arranged within the first-mentioned helical spring and located so as to come into action on the first-mentioned helical spring being partly compressed.

2. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring comprising a guiding member projecting from the free end of the second helical spring and a co-operating guiding member on the abutment of the first-mentioned helical spring adjacent the free end of the second spring, one of said guiding members being adapted to receive the other guiding member on the first-mentioned helical spring being partly compressed.

3. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring comprising a guiding member projecting from the free end of the second helical spring and a co-operating guiding member on the abutment of the first-mentioned helical spring adjacent the free end of the second spring, one of said guiding members being of elastic material, said first guiding member having a guide cavity therein into which the second guiding member is arranged to enter on the first-mentioned helical spring being partly compressed.

4. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring arranged within the first-mentioned helical spring and located so as to come into action on the first-mentioned helical spring being compressed, said guiding means comprising a domed elastic member and a member having a cavity corresponding to the domed elastic member, one of said members arranged to project from the free end of the second helical spring and the other being arranged on the abutment of the first spring adjacent the said free end.

5. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring comprising a guiding member projecting from the free end of the second helical spring and a co-operating guiding member on the abutment of the first-mentioned helical spring adjacent the free end of the second spring, said co-operating guiding member having a guide opening therein into which the other guiding member is adapted to enter on the first-mentioned helical spring being partly compressed.

6. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring comprising a guiding member projecting from the free end of the second helical spring and having an abutment thereon for the second helical spring for maintaining the second helical spring under initial stress and a co-operating guiding member on the abutment of the first-mentioned helical spring adjacent the free end of the second spring, said co-operating guiding member being adapted to receive the other guiding member on the first-mentioned helical spring being partly compressed.

7. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and guiding means for the second helical spring comprising a guiding member projecting from the free end of the second helical spring and having an abutment thereon for the second helical spring for maintaining the second helical spring under initial stress and a co-operating guiding member on the abutment of the first-mentioned helical spring adjacent the free end of the second spring, said co-operating guiding member having a guide opening therein into which the other guiding member is adapted to enter on the first-mentioned helical spring being partly compressed.

8. In a power driven vehicle, a frame, a half axle suspended so as to extend transversely to the longitudinal direction of the vehicle, a vehicle wheel on one end of said half axle, an unguided helical spring for supporting the half axle resiliently with respect to the frame, spring abutments for said helical spring on the frame and at one end of the half axle, a second helical spring arranged concentrically with respect to the first-mentioned helical spring and having one end free so as to come into action and co-operate with the first-mentioned helical spring only after the latter has been partly compressed and, guiding means for the second helical spring comprising a guiding member projecting from the free end of the second helical spring and a co-operating guiding member on the abutment of the first-mentioned helical spring adjacent the free end of the second spring, said co-operating guiding member being of elastic material and having a guide opening therein into which the other guiding member is adapted to enter on the first-mentioned helical spring being partly compressed.

9. In a power driven vehicle, the combination as set forth in claim 2 with an abutment of elastic material for the second helical spring interposed between the frame and the end of the spring remote from the co-operating guiding member.

10. In a power driven vehicle, a frame, a half axle suspended so as to extend transversely to the longitudinal direction of the vehicle, a vehicle wheel on one end of said half axle, a plurality of helical springs arranged concentrically one within the other, one of said springs being unguided, for supporting the half axle resiliently with respect to the frame, spring abutments for the unguided spring on the frame and at one end of the half axle, the other springs having one end free and adapted to come into action and co-operate with the unguided helical spring successively only after the unguided spring has been partly compressed, and guiding means for the said other springs located so as to come into action on the unguided helical spring being partly compressed.

11. In a power driven vehicle, a frame, a half axle suspended so as to extend transversely to the longitudinal direction of the vehicle, a vehicle wheel on one end of said half axle, springing means between the frame and the half axle, additional springing means arranged to come into action and co-operate with the first-mentioned springing means only after partial compression of the first-mentioned springing means, retaining means for keeping the additional springing means under initial stress, further additional springing means arranged to come into action and co-operate with the first-mentioned springing means only after further partial compression of the first-mentioned springing means and retaining means for keeping the last-mentioned springing means under an initial stress different from that of the first-mentioned additional springing means.

FRITZ NALLINGER.